United States Patent [19]

Maurer

[11] Patent Number: 5,203,888
[45] Date of Patent: Apr. 20, 1993

[54] PRESSURE SWING ADSORPTION PROCESS WITH MULTIPLE DESORPTION STEPS

[75] Inventor: Richard T. Maurer, Nanuet, N.Y.

[73] Assignee: UOP, Des Plaines, Ill.

[21] Appl. No.: 839,846

[22] Filed: Feb. 21, 1992

Related U.S. Application Data

[63] Continuation-in-part of Ser. No. 618,337, Nov. 23, 1990, abandoned.

[51] Int. Cl.$^5$ ............................................. B01D 53/04
[52] U.S. Cl. ........................................ 55/26; 55/33; 55/58; 55/62; 55/68; 55/70; 55/73
[58] Field of Search .................... 55/25, 26, 33, 58, 62, 55/68, 73, 75, 179, 180, 189, 389, 70, 71

[56] References Cited

U.S. PATENT DOCUMENTS

| | | | |
|---|---|---|---|
| 3,141,748 | 7/1964 | Hoke et al. | 55/58 X |
| 3,430,418 | 3/1969 | Wagner | 55/25 |
| 3,564,816 | 2/1971 | Batta | 55/26 |
| 3,696,588 | 10/1972 | Dussourd et al. | 55/189 X |
| 3,834,136 | 9/1974 | Dussourd et al. | 55/189 X |
| 3,934,989 | 1/1976 | Haugen | 55/189 X |
| 3,986,849 | 10/1976 | Fuderer et al. | 55/25 |
| 4,061,724 | 12/1977 | Grose et al. | 423/335 |
| 4,073,865 | 2/1978 | Flanigen et al. | 423/339 |
| 4,077,779 | 3/1978 | Sircar et al. | 55/25 |
| 4,171,207 | 10/1979 | Sircar | 55/58 X |
| 4,261,716 | 4/1981 | Schwartz et al. | 55/387 |
| 4,310,440 | 1/1982 | Wilson et al. | 252/435 |
| 4,331,456 | 5/1982 | Schwartz et al. | 55/26 |
| 4,375,363 | 3/1983 | Fuderer | 55/25 |
| 4,440,871 | 4/1984 | Lok et al. | 502/214 |
| 4,512,780 | 4/1985 | Fuderer | 55/26 |
| 4,539,020 | 9/1985 | Sakuraya et al. | 55/26 |
| 4,567,027 | 1/1986 | Detournay et al. | 423/101 |
| 4,589,888 | 5/1986 | Hiscock et al. | 55/26 |
| 4,608,061 | 8/1986 | Volles et al. | 55/26 |
| 4,650,500 | 3/1987 | Patel | 55/26 |
| 4,717,397 | 1/1988 | Wiessner et al. | 55/26 |
| 4,726,816 | 2/1988 | Fuderer | 55/26 |
| 4,755,361 | 7/1988 | Fuderer | 55/26 X |
| 4,755,396 | 7/1988 | Geisler et al. | 427/197 |
| 4,781,735 | 11/1988 | Tagawa et al. | 55/26 |
| 4,813,980 | 3/1989 | Sircar | 55/26 |
| 4,834,780 | 5/1989 | Benkmann | 55/26 |
| 4,915,711 | 4/1990 | Kumar | 55/26 |
| 4,964,889 | 10/1990 | Chao | 55/58 |

FOREIGN PATENT DOCUMENTS 0015413 2/1983 European Pat. Off. .

OTHER PUBLICATIONS

R. H. Perry & C. H. Chilton, Chemical Engineer's Handbook, 5th Edition, Chapter 6, pp. 29-32, McGraw Hill, Inc. 1973.

D. W. Breck, Zeolite Molecular Sieves, John Wiley & Sons, 1984, pp. 348, 352, 754, title page and Table 4.26.

*Primary Examiner*—Robert Spitzer
*Attorney, Agent, or Firm*—Thomas K. McBride; John G. Tolomei; Richard P. Silverman

[57] ABSTRACT

Pressure swing absorption processes are disclosed which employ a standard pressure swing absorption cycle comprising the steps of adsorption, one or more cocurrent depressurization steps for equalization or providing purge gas, a countercurrent depressurization step, a countercurrent purge step, and repressurization steps. The processes of the present invention also include an additional countercurrent desorption step performed in conjunction with the first countercurrent desorption step at above atmospheric pressure and a countercurrent purge step at about the adsorption temperature which can provide increased capacity and recovery as compared to PSA processes that only have one countercurrent depressurization step or otherwise do not have a countercurrent purge step. Preferably the pressure reduction during the second countercurrent depressurization step is accomplished by passing another stream from the process, such as the effluent from the first countercurrent desorption step, as a motive gas through an ejector which is in operative communication with the adsorber bed undergoing the second countercurrent desorption step.

31 Claims, 2 Drawing Sheets

Figure 1

| BED | | | | | | | | | | | | | | | | | | | | | | | | | | |
|---|---|---|---|---|---|---|---|---|---|---|---|---|---|---|---|---|---|---|---|---|---|---|---|---|---|---|
| 1 | E1 | R | E2 | A | | | E1 | E2 | E3 | PP1 | H | PP2 | D1 | P1 | PR | E3 | E2 | R | E1 |
| 2 | E3 | E2 | E1 | | A | | | | E1 | E2 | E3 | H | PP1 | PP2 | P1 | D1 | D2 | E3 | E2 | PR | E1 | R |
| 3 | D2 | PR | E3 | R | | | E1 | E2 | PP1 | H | E3 | E1 | | A | | | | R | E1 | E2 | PR | D2 | E3 | E1 |
| 4 | D1 | P1 | D2 | E2 | PR | E3 | D1 | PP2 | E2 | PP1 | H | E3 | E1 | | A | | | E1 | E3 | D2 | P1 | PR | D1 | D2 |
| 5 | H | PP2 | D1 | PR | D2 | D1 | H | PP1 | E2 | E3 | E1 | | A | | | R | E1 | E3 | D2 | P1 | PP2 | H | D1 |
| 6 | E3 | PP1 | H | P1 | PP2 | D1 | PP1 | E2 | E3 | E1 | | A | | | R | E1 | E2 | PR | D2 | P1 | PP2 | PP1 | H |
| 7 | E1 | E2 | E3 | PP1 | H | PP2 | E2 | PP1 | E1 | | A | | | R | E1 | E2 | PR | P1 | PP2 | PP1 | E2 | E1 |
| 8 | | A | E1 | E2 | E3 | PP1 | PP2 | E1 | | A | | | R | E1 | E3 | D2 | P1 | PP2 | PP1 | E2 | E3 | E1 |
| 9 | A | | E2 | E3 | PP1 | E1 | | A | | | R | E1 | E2 | PR | D2 | D1 | H | E3 | D1 | D2 | PR | E1 | R |
| 10 | A | | | | E1 | E2 | | A | | | | R | E1 | E2 | E3 | D1 | H | E1 | E1 | E1 | E1 | A |

CYCLE TIME, MIN.

0    4    8    12

PRESSURE SWING ADSORPTION PROCESS WITH MULTIPLE DESORPTION STEPS

CROSS-REFERENCE TO RELATED APPLICATIONS

This application is a continuation-in-part of U.S. Ser. No. 618,337, filed Nov. 23, 1990 now abandoned.

FIELD OF THE INVENTION

The present invention generally relates to pressure swing adsorption processes and more particularly to improved pressure swing adsorption processes for the separation or purification of gases wherein multiple countercurrent depressurization steps are employed in conjunction with a countercurrent purge step.

BACKGROUND OF THE INVENTION

Pressure swing adsorption (PSA) processes provide an efficient and economical means for separating a multi-component gas stream containing at least two gases having different adsorption characteristics. The more strongly adsorbed gas can be an impurity which is removed from the less strongly adsorbed gas which is taken off as product, or, the more strongly adsorbed gas can be the desired product which is separated from the less strongly adsorbed gas. For example, it may be desired to remove carbon monoxide and light hydrocarbons from a hydrogen-containing feedstream to produce a purified (99+%) hydrogen stream for a hydrocracking or other catalytic process where these impurities could adversely affect the catalyst or the reaction. On the other hand, it may be desired to recover more strongly adsorbed gases, such as ethylene, from a feedstream to produce an ethylene-rich product.

In PSA processes, a multi component gas is typically passed to at least one of a plurality of adsorption zones at an elevated pressure effective to adsorb at least one component, i.e. the more strongly adsorbed components, while at least one other component passes through, i.e. the less strongly adsorbed components. At a defined time, the passing of feedstream to the adsorber is terminated and the adsorption zone is depressurized by one or more cocurrent depressurization steps wherein the pressure is reduced to a defined level which permits the separated, less strongly adsorbed component or components remaining in the adsorption zone to be drawn off without significant concentration of the more strongly adsorbed components. Then, the adsorption zone is depressurized by a countercurrent depressurization step wherein the pressure in the adsorption zone is further reduced by withdrawing desorbed gas countercurrently to the direction of the feedstream. Finally, the adsorption zone is purged and repressurized. Such PSA processing is disclosed in U.S. Pat. No. 3,430,418, issued to Wagner, U.S. Pat. No. 3,564,816, issued to Batta, and in U.S. Pat. No. 3,986,849, issued to Fuderer et al., wherein cycles based on the use of multi-bed systems are described in detail. As is generally known and described in these patents, the contents of which are incorporated herein by reference as if set out in full, the PSA process is generally carried out in a sequential processing cycle that includes each bed of the PSA system.

As noted above the more strongly adsorbed components, i.e., the adsorbate, are removed from the adsorber bed by countercurrently depressurizing the adsorber bed to a desorption pressure. In general, lower desorption pressures are preferred in order to provide more complete removal of the adsorbate during the desorption step. In addition, lower desorption pressures can provide a greater capacity differential between adsorption and desorption conditions and thus increase the capacity of the process. However, very low desorption pressures, i.e., below atmospheric pressure, are not often used because of the technical complexities and cost associated therewith, e.g., vacuum pumping and the like. Additionally, in hydrogen purification it is often necessary to provide the desorption effluent stream, also known as tail gas, at a pressure suitable for feeding into a fuel gas header, e.g., 20–100 psia. Accordingly, when vacuum pumps are employed in PSA processes, the discharge pressure is typically maintained at or higher than the fuel gas pressure. When vacuum pumps are not employed, PSA hydrogen processes typically employ a desorption pressure of greater than or equal to the fuel gas pressure.

European Patent No. 015,413 B1, issued Feb. 9th, 1983, discloses a pressure swing adsorption process which employes a two stage countercurrent desorption step for the removal of absorbed components which can achieve subatmospheric pressure. The patent discloses that the desorption pressures are produced with the aid of jet devices, i.e., ejectors, and that gas or gas mixtures which have pressures higher than the desorption pressure and which are formed in the course of the process are used as drive means, i.e., motive gas, for the jet devices. Examples of the drive means include: the adsorption effluent, the feedstream and the effluent from the first countercurrent desorption step. The patent does not disclose the use of a countercurrent purge step in conjunction with the two countercurrent desorption steps.

U.S. Pat. No. 4,813,980, issued to Sircar, discloses a multi-column pressure swing adsorption process for simultaneous production of ammonia synthesis gas and carbon dioxide from a reformer off gas having hydrogen, nitrogen and carbon dioxide as major components accompanied by minor quantities of methane, carbon monoxide and argon as impurities. The PSA system features two groups of adsorber beds in which $CO_2$ is adsorbed in the adsorbers of the first group, i.e., the A beds, the essentially $CO_2$-free effluent being charged to an adsorber of the second group, i.e., the B beds, for removal of minor impurities while discharging an effluent gas having an $H_2/N_2$ content stoichiometric for $NH_3$ synthesis. The $CO_2$ recovered from the first group of adsorbers is available at a high purity for reaction with the ammonia product for production of urea. The first group of adsorber beds described in the above identified patent employ a two-stage countercurrent desorption step wherein during the first stage the adsorber bed is depressurized by the discharge of the contained gas to near ambient pressure. During the second desorption step the adsorber bed evacuated to sub-atmospheric level with further removal of the $CO_2$ rich effluent. There is no countercurrent purge step disclosed with regard to the adsorption cycle used in the first group of adsorbers.

One problem with the two stage desorption steps described in European Patent 015,413 B1 and U.S. Pat. No. 4,813,980, is that no provision is made for a countercurrent purge step to be used in conjunction with the two desorption steps. Thus, the two countercurrent desorption steps are functionally similar to one continuous countercurrent desorption step. Countercurrent purge steps are often employed in pressure swing adsorption processes to further desorb adsorbate from the adsorber bed and additionally remove adsorbate remaining in the void spaces of the adsorber bed after the countercurrent desorption step. PSA adsorption cycles that employ a countercurrent desorption step with a countercurrent purge step typically provide enhanced purity, capacity and recovery as compared to PSA adsorption cycles that do not employ a countercurrent purge step. Above-cited U.S. Pat. Nos. 3,430,418 and 3,986,849, for example, disclose the use of countercurrent purge steps in PSA adsorption cycles. In fact, even above-cited U.S. Pat. No. 4,813,980, which discloses two countercurrent desorption steps in the A beds, also discloses the use of a countercurrent purge step but only in conjunction with the single stage countercurrent desorption step in the B beds. As noted above, there is no disclosure of the use of a countercurrent purge step in conjunction with the two stage desorption steps employed in the first group of adsorber beds, i.e., the A beds.

U.S. Pat. Nos. 4,261,716 and 4,331,456, issued to Schwartz et al., are directed to improved processes for recovering hydrocarbons from an air-hydrocarbon mixture, such as the mixture of air and vaporized light hydrocarbon compounds expelled as a result of loading gasoline or the like into storage tanks and tank trucks. The patents disclose an adsorption cycle wherein the regeneration of the adsorber beds is accomplished by evacuating the beds with a vacuum pumping whereby a major portion of the hydrocarbons are desorbed therefrom, subsequently introducing a small quantity of heated hydrocarbon free air into the beds whereby additional hydrocarbons are stripped therefrom and then subjecting the bed to further evacuation by ejector jet pumping while continuing to evacuate the bed by vacuum pumping whereby yet additional hydrocarbons are desorbed therefrom. The air-hydrocarbon mixture produced in the regeneration of the beds is contacted with a liquid adsorbent whereby a major portion of the hydrocarbons are desorbed therefrom and recovered. The non-absorbed gas from the liquid absorbent is used as the motive gas for the ejector. Thus, the processes described in U.S. Pat. Nos. 4,261,716 and 4,331,456 require that both the first countercurrent depressurization step and the purging step be conducted under vacuum conditions. Further, the patents require that the purge gas be heated.

Thus, improved pressure swing adsorption processes are sought which employ multiple desorption steps in addition to a countercurrent purge step wherein the first countercurrent depressurization step can be conducted at above-atmospheric pressure. Improved processes are further sought wherein the countercurrent purge step is conducted at or near the adsorption temperature and further that the tail gas obtained from the process be available at a tail gas pressure that is sufficient for use as a fuel gas.

SUMMARY OF THE INVENTION

By the present invention pressure swing adsorption processes suitable for separating or purifying feedstreams are provided which employ multiple countercurrent desorption steps in addition to a countercurrent purge step. The processes can provide enhanced recovery of the non-adsorbed components and capacity for the adsorbate components. Preferably two countercurrent desorption steps are employed with a countercurrent purge step between the two desorption steps. The first countercurrent desorption step is conducted at above atmospheric pressure and at about the temperature at which the adsorption step is conducted. It is further preferred that the desorption effluent stream from the first desorption step is used as a motive gas to drive an ejector in operative communication with another adsorber bed undergoing the second desorption step in order to provide a tail gas stream at a tail gas pressure that is intermediate between the first and second desorption pressures.

In one aspect of the present invention there is provided a pressure swing adsorption process for separating a first component from a feedstream comprising said first component and at least one other component, wherein a plurality of adsorber beds are employed and each of said adsorber beds is subjected to a repetitive cycle comprising the steps of: (a) passing the feedstream to a first adsorber bed containing adsorbent having adsorptive capacity for the other component at effective adsorption conditions including an adsorption pressure and temperature, and withdrawing a product stream enriched in said first component relative to the feedstream from the first adsorber bed; (b) cocurrently depressurizing the first adsorber bed to an equalization pressure that is lower than the adsorption pressure and passing the effluent therefrom to a second adsorber bed being repressurized; (c) countercurrently depressurizing the first adsorber bed to a first desorption pressure that is above atmospheric pressure and lower than the equalization pressure and effective to desorb the other component and withdrawing a first desorption effluent comprising said other component; (d) countercurrently purging the first adsorber bed with a purge feed comprising the first component at about the adsorption temperature and withdrawing a purge effluent comprising the other component; (e) further countercurrently depressurizing the first adsorber bed to a second desorption pressure that is lower than the first desorption pressure and effective to further desorb the other component and withdrawing a second desorption effluent stream comprising said other component; and (f) repressurizing the first adsorber bed to the adsorption pressure.

In another aspect of the present invention there is provided a pressure swing adsorption process for separating a first component from a feedstream comprising said first component and at least one other component, wherein a plurality of adsorber beds having a feed end and a product end are employed and each of said adsorber beds is subjected to a repetitive cycle comprising the steps of: (a) passing the feedstream to the feed end of a first adsorber bed containing adsorbent having adsorptive capacity for the other component at effective adsorption conditions including an adsorption pressure and temperature, and withdrawing a product stream enriched in the first component, relative to the feedstream, from the product end of the first adsorber bed; (b) cocurrently depressurizing the first adsorber bed to an equalization pressure that is lower than the adsorption pressure and passing the effluent therefrom to the product end of a second adsorber bed being repressurized; (c) further countercurrently depressurizing the first adsorber bed to a first desorption pressure that is above atmospheric pressure and lower than the equalization pressure and effective to desorb the other component and withdrawing a first desorption effluent comprising the other component from the feed end of the first adsorber bed; (d) countercurrently purging the first adsorber bed with a purge feed comprising the first component at about the adsorption temperature and withdrawing a purge effluent comprising the other component from the feed end of the first adsorber bed; (e) either simultaneously with or subsequently to the countercurrently purging, further countercurrently depressurizing the first adsorber bed to a second desorption pressure that is lower than the first desorption pressure and effective to further desorb the other component and withdrawing a second desorption effluent stream comprising the other component from the feed end of the first adsorber bed, wherein the further countercurrently depressurizing is conducted by passing at least a portion of the first desorption effluent stream from a third adsorber bed which is simultaneously undergoing the countercurrently depressurizing to the first desorption pressure, through an ejector in operative communication with the first adsorber bed; and (f) repressurizing the first adsorber bed to the adsorption pressure.

In a further aspect of the present invention there is provided a pressure swing adsorption process for enriching the hydrogen concentration of a feedstream comprising hydrogen and at least one other component selected from methane, ethane, carbon monoxide, carbon dioxide, ammonia, nitrogen, hydrogen sulfide and water. In the process, a plurality of adsorber beds having a feed end and a product end are employed and each of the adsorber beds is subjected to a repetitive cycle comprising the steps of: (a) passing the feedstream to the feed end of a first adsorber bed containing adsorbent having adsorptive capacity for the other component at effective adsorption conditions including an elevated adsorption pressure, and withdrawing a product stream enriched in hydrogen relative to the feedstream from the product end of the first adsorber bed; (b) cocurrently depressurizing the first adsorber bed to an equalization pressure that is lower than the adsorption pressure and passing the effluent therefrom to the product and a second adsorber bed being repressurized; (c) countercurrently depressurizing the first adsorber bed to a first desorption pressure that is lower than the equalization pressure and effective to desorb the other component and withdrawing a first desorption effluent comprising the other component from the feed end of the first adsorber bed; (d) countercurrently purging the first adsorber bed with a purge feed comprising hydrogen and withdrawing a purge effluent comprising the other component from the feed end of the first adsorber bed; (e) either simultaneously with or subsequently to the countercurrently purging, further countercurrently depressurizing the first adsorber bed to a second desorption pressure that is lower than the first desorption pressure and effective to further desorb the other component and withdrawing a second desorption effluent stream comprising the other component from the feed end of the first adsorber bed, wherein the further countercurrently depressurizing is conducted by passing at least a portion of the first desorption effluent stream from a third adsorber bed which is simultaneously undergoing the countercurrently depressurizing to the first desorption pressure through an ejector in operative communication with the first adsorber bed; and (f) repressurizing the first adsorber bed to the adsorption pressure.

BRIEF DESCRIPTION OF THE DRAWINGS

FIG. 1 illustrates an adsorption cycle diagram for a 10 adsorber bed PSA process in accordance with the present invention.

DETAILED DESCRIPTION OF THE INVENTION

Figure 2:
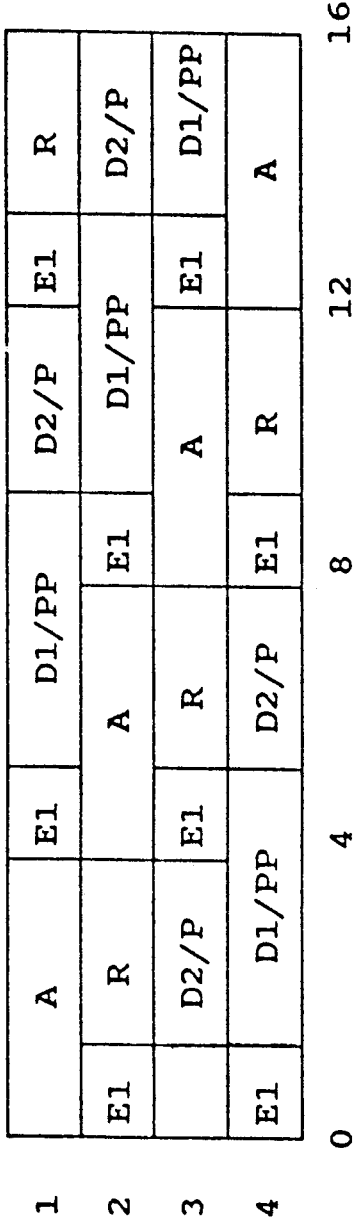
FIG. 2 illustrates an adsorption cycle diagram of a 4 adsorber bed PSA process in accordance with the present invention.

The present invention is directed to pressure swing adsorption processes for the separation of a first component from feedstreams comprising said first component and at least one other component. In accordance with the present invention, the term "first component" denotes a non-adsorbed or less strongly adsorbed component in the feedstream. The term "other component" denotes an adsorbate, i.e., more strongly adsorbed component in the feedstream.

The processes can be used to perform bulk separations or purification separations and accordingly have applicability to a wide variety of feedstreams. Suitable feedstreams are those which are gaseous at the adsorption conditions. When the invention is applied to separation or purification of hydrogen-containing feedstreams, suitable feedstreams are those which contain a hydrogen concentration preferably in the range of from about 10 to 90 mol. %. Adsorbates, i.e., other components which are present in the feedstream typically include one or more of the following, for example, light hydrocarbons such as methane and ethane, carbon monoxide, carbon dioxide, water, hydrogen sulfide, ammonia, nitrogen and oxygen. The feedstream may occasionally comprise other adsorbates such as hydrocarbons in the $C_3$–$C_6$ carbon range, alcohols, ethers, amines, mercaptans, aldehydes, ketones and the like. The first component will be determined based upon the other components present in the feed, the adsorption conditions and the adsorbent employed. Thus, there can be instances when the above-described adsorbates can be characterized as the first component. For example, in the separation of nitrogen from methane such as described in U.S. Pat. No. 4,964,889, nitrogen is the adsorbate and methane is recovered as the non-adsorbed product. In contrast, in hydrogen purification processes, methane is often an adsorbate.

Thus, the processes of the present invention are not limited to particular feedstreams and can be employed to practice a variety of separations such as, for example; the separation of hydrogen from feedstreams comprising hydrogen, methane, carbon monoxide and nitrogen, wherein hydrogen is not adsorbed; the separation of air into nitrogen and oxygen by adsorption of the nitrogen; the separation of carbon dioxide from non-acidic gases such as nitrogen, hydrogen and methane by adsorbing carbon dioxide such as described in U.S. Pat. No. 4,755,396; and the separation of normal butane from isobutane by adsorbing normal butane such as described in U.S. Pat. No. 4,608,061.

Typical feedstreams for processing in accordance with the present invention are derived from refineries, natural gas, air and chemical plants. Examples of feed sources include reformer off gas from the reforming of light hydrocarbons or methanol, synthesis gas and natural gas.

The products obtained in the process of the present invention accordingly have a variety of uses depending upon the feedstream. For example, a PSA hydrogen process can be operated to provide very high purity hydrogen, e.g., 99+ mol. % for use as a chemical feedstock. Alternately, the process can provide a certain adsorbate concentration in the hydrogen product stream, such as when providing an ammonia synthesis gas having 3 moles of hydrogen per mole of nitrogen, e.g., the product would contain about 75 mol. % hydrogen. When butane feedstreams are separated to form an isobutane product, the isobutane can be used, for example, as alkylate feed or as a gasoline blending component.

The present invention can be carried out using virtually any adsorbent material in the adsorber beds that has capacity for the adsorbate components. Suitable adsorbents known in the art and commercially available include crystalline molecular sieves, activated carbons, activated clays, silica gels, activated aluminas and the like. The molecular sieves include, for example, the various forms of silicoaluminophosphates and aluminophosphates disclosed in U.S. Pat. No. 4,440,871; 4,310,440 and 4,567,027, hereby incorporated by reference as well as zeolitic molecular sieves.

Zeolitic molecular sieves in the calcined form may be represented by the general formula;

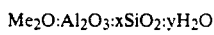

$Me_2O:Al_2O_3:xSiO_2:yH_2O$ where Me is a cation, x has a value from about 2 to infinity, n is the cation valence and y has a value of from about 2 to 10.

Typical well-known zeolites which may be used include, chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having a high silica content, i.e., those having silica to alumina ratios greater than 10 and typically greater than 100. One such high silica zeolite is silicalite, as the term used herein includes both the silicapolymorph disclosed in U.S. Pat. No. 4,061,724 and also the F-silicate disclosed in U.S. Pat. No. 4,073,865, hereby incorporated by reference. Detailed descriptions of some of the above-identified zeolites may be found in D. W. Breck, *Zeolite Molecular Sieves*, John Wiley and Sons, New York, 1974, hereby incorporated by reference. The selection of a particular adsorbent for a particular separation can be made by one skilled in the art with routine experimentation and need not be further discussed herein.

It is often desirable when using crystalline molecular sieves that the molecular sieve be agglomerated with a binder in order to ensure that the adsorbent will have suitable physical properties. Although there are a variety of synthetic and naturally occurring binder materials available such as metal oxides, clays, silicas, aluminas, silica-aluminas, silica-zirconias, silica thorias, silica-berylias, silica-titanias, silica-aluminas-thorias, silica-alumina-zirconias, mixtures of these and the like, clay-type binders are preferred. Examples of clays which may be employed to agglomerate the molecular sieve without substantially altering the absorptive properties of the zeolite are attapulgite, kaolin, volclay, sepiolite, polygorskite, kaolinite, bentonite, montmorillonite, illite and chlorite. The choice of a suitable binder and methods employed to agglomerate the molecular sieves are generally known to those skilled in the art and need not be further described herein.

The PSA cycle of the present invention includes the well known cycle steps of absorption, one or more equalization steps, countercurrent desorption, purge and repressurization. The cycle steps are typically described with reference to their direction relative to the absorption step. Thus cycle steps wherein the gas flow is in a concurrent direction to the absorption step are known as "cocurrent" steps. Similarly cycle steps wherein the gas flow is countercurrent to the absorption step are known as "countercurrent" steps. During the absorption step the feedstream is passed to the absorber bed at an elevated absorption pressure in order to cause the absorption of the absorbate and provide a product stream enriched in the first component relative to feedstream. During the equalization steps the pressure in the depressurizing bed is released preferably cocurrently and the effluent obtained therefrom, which is preferably rich in the first component, is passed in a countercurrent direction to another absorber undergoing repressurization. Typically at the conclusion of the equalization steps a provide purge step is initiated wherein the absorber bed is further cocurrently depressurized to provide a purge gas that is relatively impure with respect to the first component and thus is suitable for use as a purge gas. Optionally instead of the provide purge step a portion of the product gas or gas obtained from one of the equalization steps can be used to supply the purge gas. Upon completion of the provide purge step, if employed, the absorber bed is countercurrently depressurized to a desorption pressure in order to desorb the absorbate. Upon completion of the desorption step the absorber bed is purged countercurrently with purge gas obtained from another absorber bed. Finally the absorber bed is repressurized, first, with equalization gas from other absorber beds and then with feed or product gas to absorption pressure. Other additional steps known to those skilled in the art, such as for example, a copurge step wherein the absorber bed is cocurrently purged at an elevated pressure such as the absorption pressure with a purge stream comprising the absorbate, can be employed.

The present invention is direted to an improvement to the basic PSA cycle sequence described above wherein an additional countercurrent desorption step, i.e., depressurization, is included in the cycle. The second countercurrent desorption step is conducted by depressurizing the bed in a countercurrent direction to a second desorption pressure that is lower than the pressure at the end of the first desorption step, i.e., first desorption pressure.

In order to achieve the benefits of the present invention it is necessary to include a countercurrent purge step in conjunction with the two countercurrent desorption steps. Preferably the countercurrently purging step is performed prior to, or simultaneously with, the second countercurrent desorption step. Thus, in some instances, the countercurrently purging step will be completed before the second countercurrent desorption step begins. In other instances at least a portion of the countercurrently purging step will occur simultaneously with the second countercurrent desorption step. It is of course possible to conduct the countercurrently purging step subsequently to the second countercurrent desorption step. Without being limited to any particular theory, it is believed that if the countercurrently purging step is conducted subsequently to the first countercurrent desorption step, this purge helps to sharpen the absorbate front within the absorber bed and concentrate the absorbate at the feed end of the absorber bed, i.e., where the feedstream is introduced. Accordingly, when the second countercurrent desorption step is then conducted more absorbate is removed than when no countercurrently purging step is included. Preferably, an effective quantity of purge gas is provided during the countercurrently purging to provide an increased concentration of the absorbate component in the feed end of the absorber bed relative to the product end. Even more preferably the effective quantity of purge gas is from about 0.5 to 2 volumes of purge gas per volume of feedstream, and even more preferably from about 0.5 to 1 volumes of purge gas per volume of feed.

The pressure reduction during the second countercurrently depressurizing step can be achieved by any means such as a vacuum pump, but preferably in accordance with the present invention the second countercurrently depressurizing step is accomplished with the use of an ejector. Suitable ejectors for use in accordance with the present invention are also known in the art as, for example, jet pumps or fluid entrainment pumps, all of which operate according to the following principle: a motive gas stream under an elevated pressure is depressurized through a nozzle where the molecules in the motive gas experience an increase in velocity and thus in momentum. Molecules in the motive gas accelerated in this way then entrain molecules of the medium drawn in as intake by transfer of the momentum within the mixing space. The kinetic energy is partially converted back to compression energy in a diffuser so the result is a mixed stream whose pressure is between the original pressure of the motive gas and that of the intake medium. The details concerning the design and operation of ejectors is well known to those skilled in the art and need not be further discussed herein. See for example R. H. Perry and C. H. Chilton *Chemical Engineers Handbook*, 5th Edition, Chapter 6, pages 29-32, McGraw Hill, Inc., 1973.

In aspects of the invention wherein an ejector is employed, the motive gas which is used to drive the ejector and create the suction required to achieve the second desorption pressure can be any fluid stream available in the process plant whether it is derived from the PSA process or from another process. Preferably however, the motive gas is derived from the PSA process, and even more preferably, comprises the countercurrent desorption effluent from the first desorption step and/or the purge gas feed or effluent from another adsorber bed undergoing said steps simultaneously with the second countercurrent desorption step. This is not to say that the step which supplies the motive gas must be completely simultaneous with the second desorption step, but rather only a portion must be conducted simultaneously. In fact, motive gas from two or more process steps, or beds, can be used to drive the ejector during a single second desorption step. Examples of other motive gas streams that can be used include the feedstream, the adsorption effluent product stream and cocurrent depressurization effluent streams used for equalization.

Those skilled in the art will recognize that many of the preferred motive gases used in accordance with the present invention undergo unsteady flow conditions due to the decreasing pressure and hence flow rate of the depressurizing adsorber bed. Thus, under such conditions many ejectors will not perform as well as a conventional design chart would indicate wherein the motive gas is provided at a steady pressure and flow rate. Accordingly, it may be desirable to install two or more ejectors each being optimized for the particular flow condition that it will experience. For example, at the beginning of the first countercurrent depressurization step when the pressure and flow rate of the motive gas are high, it would be preferred to employ a higher throat to nozzle area ratio than an ejector used on the motive gas at the end of the countercurrent desorption step, i.e., low pressure and low flow rate. Alternatively, it may be desirable to provide an ejector with a variable throat to nozzle area ratio in order to accommodate the varying motive gas conditions.

Further, in accordance with the present invention it is not necessary for an ejector to be connected directly with its suction side to the adsorber simultaneously undergoing the second stage of desorption. Instead, in one aspect of the invention, a vessel is provided for storing and delivering the ejectors suction benefits at the appropriate time in the PSA cycle. As such the suction side of the ejector is connected to the vessel and thus reduces the pressure therein when the motive gas is available. Later in the cycle when it is necessary to employ the suction benefits of the ejector to reduce the pressure in an adsorber bed, the vessel is connected to said bed undergoing the second stage of desorption to draw it down in pressure causing a rise in pressure in the storage vessel. Still later in the cycle or in a subsequent cycle the ejector again reduces the pressure in the storage vessel.

When the process of the present invention is used for hydrogen purification, it is preferred that the effluent from the ejector, i.e., the tail gas, comprises the desorption effluent streams from the first and second countercurrent desorption effluent streams and will be provided at a tail gas pressure that is sufficient to permit introduction into a fuel gas header. Typical fuel gas, and hence tail gas, pressures will be in the range of from about 20 to 100 psia and preferably from about 20 to 50 psia.

The temperatures used in the adsorption process of the present invention are not critical and are dependent on the feedstream and desired separation, although in general the process is substantially isothermal. Typical temperatures range between about $-100°$ to 700° F., and preferably within the range of about 50° to 200° F., and even more preferably from about 50° to 150° F. for hydrogen purification. In accordance with the present invention the countercurrently purging step described above is to be performed at about the same temperature as the adsorption step, preferably within about 50° F. and more preferably within about 20° F. It is to be understood, however, that even though the process is generally isothermal, there is to be expected a certain degree of temperature increase and decrease associated with the thermal effects of the heats of adsorption and desorption.

Similarly the absolute pressure levels employed during the PSA process are not critical provided that the pressure differential between the adsorption and desorption steps is sufficient to cause a change in the adsorbate fraction loading on the adsorbent thereby providing a delta loading effective for separating the feedstream. Typical pressure levels range from about 100 to 2000 psia, more preferably from about 200 to 1000 psia, and even more preferably from about 400 to about 1000 psia, during the absorption step; and from about 1 to 500 psia, more preferably from about 5 to 50 psia, at the end of the second desorption step. It is to be understood that the pressures during the equalization steps provide purge step first countercurrent desorption step and countercurrent purge step are intermediate between the adsorption and second desorption steps. In accordance with the present invention, the pressure at the end of the first desorption step is above atmospheric pressure.

In some instances such as in hydrogen purification, it is preferred that the second desorption pressure be selected in combination with the first desorption pressure to provide the desired tail gas pressure. Thus the second desorption pressure can either be above or below atmospheric pressure. For example, if the first desorption step is initiated at a relatively high pressure and the first desorption effluent is used as motive gas in the ejector, then it will be possible to obtain a lower pressure at the end of the second desorption step and still provide a tail gas pressure intermediate between the starting motive gas pressure and the ending second desorption pressure, and still sufficiently high to be passed through a fuel gas header.

In general the total cycle time, that is, the time required to perform all the individual steps in the PSA cycle ranges from about 3 to 30 minutes, and more preferably within the range of about 4 to 20 minutes. At least two adsorber beds are required in order to perform each equilization step and typically at least four adsorber beds are required in order to provide a constant source of product gas. Preferably from about 4 to 14 adsorber beds are employed, more preferably from about 7 to 14, and most preferably from about 10 to 12 in accordance with the present invention.

The invention is hereafter described with reference to the examples and drawings which are provided for illustrative purposes and not intended to limit the scope of the claims in any way.

EXAMPLE 1

Base Case 10 Bed Cycle

A PSA process having 10 adsorber beds with three adsorbers on an adsorption step at any given time, and three equalization steps was simulated using a computer simulation model routinely used for designing commercial PSA processes. The basis for the simulation was that the above-described PSA process would be capable of treating 60 MMSCFD of a feedstream at 600 psia having a composition of 20 mole % methane with the balance hydrogen. The cycle comprised the steps of adsorption at 600 psia, three equalization steps, and a provide purge step with the pressure at the end of the provide purge step at 145 psia, followed by a countercurrent desorption step to a pressure of 25 psia, a countercurrently purging step with a purge quantity of about 0.6 volumes of purge gas per volume of feed, followed by a repressurization with equalization gas and product gas.

The results of this simulation are shown in Table 1 under the first column entitled "Single Stage Desorption".

TABLE 1

| Condition | Single Stage Desorption | Dual Stage Desorption | |
| --- | --- | --- | --- |
| | | without purge | with purge |
| 1st Desorption Pressure (psia) | 25 | 25 | 25 |
| 2nd Desorption Pressure (psia) | — | 11 | 11 |
| Purge Quantity volumes purge volume feed | 0.6 | — | 0.6 |
| Capacity[1] | 82.5 | 87.4 | 91.5 |
| Recovery[2] | 84.4 | 85.4 | 87.0 |
| Productivity[3] | 69.5 | 74.6 | 79.6 |

[1]Capacity = (MMSCFH feed/CF adsorbent) × 0.1
[2]Recovery = moles $H_2$ product/moles $H_2$ feed × 100
[3]Productivity = Capacity × Recovery/100

It can be seen that the above-described cycle produced a capacity of 82.5, hydrogen recovery of 84.4%, and productivity of 69.5%.

EXAMPLE 2

Ten Bed Adsorption Cycle with Two Countercurrent Depressurization Steps

A second simulation was performed on a cycle similar to that described above with the exception that no provide purge or countercurrently purging steps were included. The process was simulated to provide a pressure at the end of the first desorption step of 25 psia. In addition a second desorption step was included whereby an ejector was employed to reduce the pressure during the second desorption step to 11 psia. The motive gas used to drive the ejector was obtained from another adsorber bed undergoing the first desorption step. The ejector performance was simulated based on conventional single stage ejector performance charts, e.g., FIG. 6-72 in above cited *Chemical Engineers Handbook*, for a throat to nozzle area ratio of 10 with an additional 25% contingency to account for the non-steady state operation and non-optimum area ratios at the beginning and the end of the first countercurrent desorption step. The simulation indicated that the adsorber bed undergoing the second desorption step could be drawn down to about 8 psia, however in order to account for resistance due to pressure drop, 3 psi were added to the 8 psia to arrive at 11 psia final desorption pressure.

It can be seen from Table 1, second column, entitled "Dual Stage Desorption—without purge", that the capacity factor was increased to 87.4, with the addition of the second desorption step. Also the recovery was improved by 1% to 85.4%, and the productivity was increased to 74.6%. Much of this improvement resulted from increasing the pressure swing of the overall cycle from the highest pressure of the feed to the lowest pressure of the last desorption step. This new cycle permitted the waste pressure to be reduced to 11 psia, a level which could not be reached in the cycle of Example 1 without this second desorption step.

EXAMPLE 3

Ten Bed Cycle With Two Countercurrent Desorption Steps and a Countercurrent Purge Step FIG. 1 illustrates a 10 bed PSA cycle that employs the process of the present invention wherein two countercurrent desorption steps are provided in conjunction with a countercurrently purging step. The cycle sequence is similar to that described to Examples 1 and 2. For instance, following the cycle's progression of bed (1) it can be seen that bed (1) first undergoes an adsorption step which is then followed by three equalization steps, wherein the effluent obtained therefrom is passed to adsorber beds 5, 6 and 7 respectively, each of which are labeled E1, E2 and E3 during the appropriate time frame. Bed (1) then undergoes a series of provide purge steps labeled PP1, H and PP2, which are analogous to a single provide purge step in the cycle described in Example 1. During the first provide purge step PP1, the effluent obtained is passed to bed 9, undergoing a first purging step. The time period labeled H, represents a hold period wherein the bed is isolated. During the second provide purge step, labeled PP2, the effluent obtained therefrom is passed to bed 9 during the time frame labeled PR. During this time period the valves on the feed end of bed 9 are closed in order to begin the repressurization sequence. Alternately, a valve on the feed end of bed 9 could left open in order to provide a second purge step during this time frame. The decision to purge or repressurize during the second provide purge step is not critical to the present invention and can be made by one skilled in the art. After the second provide purge step, adsorber bed (1) is depressurized countercurrently during the time period labeled D1 to a pressure of about 25 psia. At this point in accordance with the present invention adsorber bed (1) is purged countercurrently during the time period labeled P1 with provide purge gas obtained from adsorber bed (3) undergoing the first provide purge step. At the conclusion of the countercurrently purging, bed (1) is further countercurrently depressurized to about 11 psia. This second pressure reduction is accomplished by the use of an ejector which is operative communication with adsorber bed (2) undergoing the first depressurization stage. After the second desorption stage is completed adsorber bed (1) is repressurized during the time periods PR, E3, E2, E1 and R with effluent gas obtained from adsorber beds (3), (5), (6), (7) and the effluent product gas from at least one of adsorber beds (8), (9) or (10). As previously noted with respect to adsorber bed (9) during the time period labeled PR, adsorber bed (1) could alternately be purged a second time. The time period corresponding to P1, D2 and PR, in FIG. 1, is analogous to the time period wherein the adsorber bed is purged in Example 1.

The results from the simulation of the process in accordance with the present invention are shown in Table 1, column 3, titled "Dual Stage Desorption—with purge." It can be seen that the performance of the process is substantially improved by the addition of the countercurrent purge in addition to the second desorption step. Note, for example, that the capacity factor was increased to 91.5, the hydrogen recovery was increased to 87.0, and the productivity was increased to 79.6%. Although not shown in the Table, even when a substantial purge quantity was employed, e.g., 1.4 volumes of purge per volume of feed, the performance of the cycle simulated in Example 3 was improved compared to the performance obtained with the cycle simulated in Example 1. As in Example 3, the improved cycle increased the pressure swing of the overall cycle to reach a lower waste gas pressure of 11 psia to provide the productivity benefits.

EXAMPLE 4

Four Bed Cycle

FIG. 2 illustrates an adsorption cycle diagram for a PSA process in accordance with the present invention having four adsorber beds. In this aspect of the present invention the second countercurrent desorption step is conducted simultaneously with the countercurrent purge step. Additionally, the adsorber bed that is undergoing the first countercurrent desorption step, which preferably provides the motive gas to drive an ejector, is simultaneously cocurrently depressurized to provide purge gas. This type of step is known in the PSA art as a dual-ended depressurization. Referring to bed (1) in FIG. 2, the cycle comprises an adsorption step labeled A, followed by an equalization step during time period E1, wherein the effluent gas is passed to adsorber bed (3) undergoing equalization. Then the bed is depressurized both cocurrently and countercurrently to provide the purge gas and the first desorption effluent gas. At the conclusion of the first desorption/provide purge step the bed is further countercurrently depressurized and simultaneously countercurrently purged during the time period labeled D2/P. At the conclusion of the second desorption/purging step the adsorber bed is repressurized during the E1 and R time periods.

Figure 3:
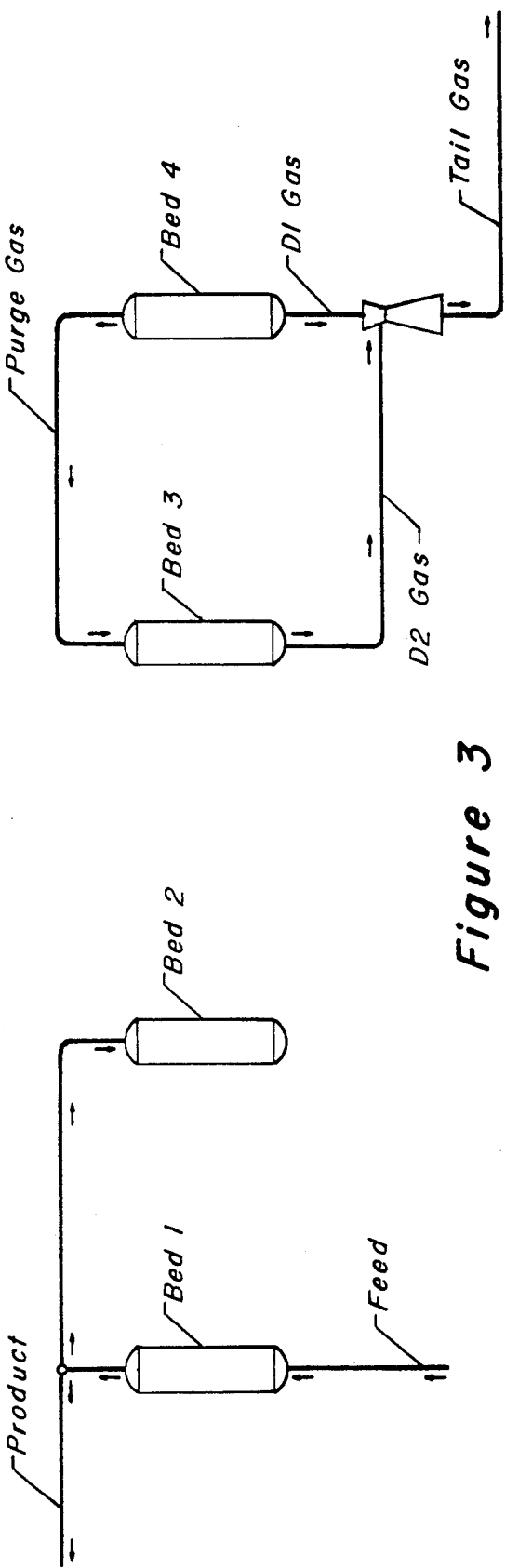
FIG. 3 illustrates the flow connections between the adsorber beds at a particular time during the cycle illustrated in FIG. 2.

FIG. 3 illustrates the flow connections between adsorber beds at a time period during the adsorption cycle shown in FIG. 2 at about 3 minutes. It can be seen that bed (1) is undergoing the adsorption step wherein a feedstream is passed to the feed end of the adsorber bed and an effluent stream is withdrawn from the product end of the adsorber bed. A portion of the effluent stream is withdrawn as product and the remaining portion is passed to adsorber bed (2) undergoing repressurization. Adsorber bed 3 is simultaneously being countercurrently purged and countercurrently depressurized to the second desorption pressure. The pressure reduction is accomplished by passing the second desorption effluent stream labeled "D2 gas" to the suction side of an ejector. Purge gas obtained from the product end of bed (4) is used to countercurrently purge adsorber bed (3). Adsorber bed (4) is undergoing a dual ended depressurization step in order to provide purge gas for purging adsorber bed (3) and the first desorption effluent gas labeled "D1 gas" which is used as a motive gas to drive the ejector. A tail gas stream comprising the first and second desorption effluent streams is withdrawn from the ejector and removed from the process.

It will be understood by those skilled in the art that many variations of the above described examples are possible within the scope of the present invention. For example, the number of adsorber beds, number of equalization steps, connections between the beds and the like, can be modified to achieve the desired results. In addition, multiple trains of adsorber beds can be employed with the countercurrent desorption and purging steps occurring in separate trains of adsorbers rather than in one train. Furthermore, motive gas from one adsorber train can be used to drive an ejector in operative communication with an adsorber bed in another adsorber train. Similarly too, as noted above, various streams in addition to the first countercurrent effluent and purge gas can be used to drive the ejector. For example, the feedstream can be used as a motive gas to drive the ejector which is in operative communication with a bed undergoing the countercurrent desorption step. Instead of passing the effluent gas out of the process, the effluent from the ejector can be returned to the feed side of another adsorber bed as copurge gas. Moreover, it will be appreciated that although the process has been described above with reference to a first and a second countercurrent desorption step, more than two countercurrent desorption steps can be employed within the process of the present invention. In such cases it is preferred to perform the countercurrent purge step prior to the final countercurrent desorption step. It is to be further noted that all references to patents and publication not specifically incorporated by reference are hereby incorporated by reference herein.

I claim:

1. A pressure swing adsorption process for separating a first component from a feedstream comprising said first component and at least one other component, wherein a plurality of adsorber beds are employed and each of said adsorber beds is subjected to a repetitive cycle comprising the steps of;
   (a) passing the feedstream to a first adsorber bed containing adsorbent having adsorptive capacity for said other component at effective adsorption conditions including an adsorption pressure and temperature, and withdrawing a product stream enriched in said first component relative to the feedstream from the first adsorber bed;
   (b) cocurrently depressurizing the first adsorber bed to an equalization pressure that is lower than the adsorption pressure and passing the effluent therefrom to a second adsorber bed being repressurized;
   (c) countercurrently depressurizing the first adsorber bed to a first desorption pressure that is above atmospheric pressure and lower than the equalization pressure and effective to desorb said other component and withdrawing a first desorption effluent comprising said other component;
   (d) countercurrently purging the first adsorber bed with a purge feed at about the adsorption temperature and withdrawing a purge effluent comprising said other component;
   (e) either simultaneously with or subsequently to said countercurrently purging further countercurrently depressurizing the first adsorber bed to a second desorption pressure that is lower than the first desorption pressure and effective to further desorb said other component and withdrawing a second desorption effluent stream comprising said other component; and
   (f) repressurizing the first adsorber bed to the adsorption pressure.

2. The process of claim 1 wherein said countercurrently purging is conducted prior to said further countercurrently depressurizing.

3. The process of claim 1 wherein said countercurrently purging is conducted at least in part simultaneously with said further countercurrently depressurizing.

4. The process of claim 1 further comprising passing at least a portion of the first desorption effluent stream through an ejector in operative communication with a third adsorber bed undergoing step (e) thereby causing the third adsorber bed to depressurize to the second desorption pressure.

5. The process of claim 1 further comprising cocurrently depressurizing the first adsorber bed to a provide-purge pressure that is lower than the equalization pressure and higher than the first desorption pressure and withdrawing a purge stream comprising the purge feed.

6. The process of claim 5 comprising passing at least a portion of the purge stream through an ejector in operative communication with a third adsorber bed undergoing step (e) thereby causing the third adsorber bed to depressurize to the second desorption pressure.

7. The process of claim 6 comprising passing the purge feed through the ejector.

8. The process of claim 6 comprising passing the purge effluent through the ejector.

9. The process of claim 1 wherein the second desorption pressure is above atmospheric pressure.

10. The process of claim 1 wherein the second desorption pressure is below atmospheric pressure.

11. The process of claim 1 wherein the adsorption conditions include an adsorption pressure of from about 50 to 2000 psia and an adsorption temperature of from about 0° to 300° F.

12. The process of claim 1 wherein said first component is hydrogen and said other component is selected from methane, ethane, carbon monoxide, carbon dioxide, ammonia, nitrogen, hydrogen sulfide and water.

13. The process of claim 1 wherein said first component is nitrogen.

14. The process of claim 13 wherein said other component is selected from methane, ethane, carbon monoxide, carbon dioxide, ammonia, hydrogen sulfide and water.

15. The process of claim 1 wherein said first component is methane and said other component is nitrogen.

16. The process of claim 1 wherein the first component is oxygen and the other component is nitrogen.

17. The process of claim 1 wherein the first component is isobutane and the other component is normal butane.

18. A pressure swing adsorption process for separating a first component from a feedstream comprising said first component and at least one other component, wherein a plurality of adsorber beds having a feed end and a product end are employed and each of said adsorber beds is subjected to a repetitive cycle comprising the steps of:
   (a) passing the feedstream to the feed end of a first adsorber bed containing adsorbent having adsorptive capacity for said other component at effective adsorption conditions including an adsorption pressure and temperature, and withdrawing a product stream enriched in said first component relative to the feedstream from the product end of the first adsorber bed;
   (b) cocurrently depressurizing the first adsorber bed to an equalization pressure that is lower than the adsorption pressure and passing the effluent therefrom to the product end of a second adsorber bed being repressurized;
   (c) countercurrently depressurizing the first adsorber bed to a first desorption pressure that is above atmospheric pressure and lower than the equalization pressure and effective to desorb said other component and withdrawing a first desorption effluent comprising said other component from the feed end of the first adsorber bed;
   (d) countercurrently purging the first adsorber bed with a purge feed comprising the first component at about the adsorption temperature and withdrawing a purge effluent comprising said other component from the feed end of the first adsorber bed;
   (e) either simultaneously with or subsequently to said countercurrently purging, further countercurrently depressurizing the first adsorber bed to a second desorption pressure that is lower than the first desorption pressure and effective to further desorb said other component and withdrawing a second desorption effluent stream comprising said other component from the feed end of the first adsorber bed, wherein said further countercurrently depressurizing is conducted by passing at least a portion of the first desorption effluent stream from a third adsorber bed which is simultaneously undergoing said countercurrently depressurizing to the first desorption pressure, through an ejector in operative communication with the first adsorber bed; and (f) repressurizing the first adsorber bed to the adsorption pressure.

19. The process of claim 18 comprising at least 4 adsorber beds.

20. The process of claim 19 comprising from 4 to about 14 adsorber beds.

21. The process of claim 18 comprising withdrawing a tail gas stream from the ejector comprising the first and second desorption effluent streams.

22. The process of claim 21 wherein the tail gas stream is withdrawn at a tail gas pressure that is intermediate between the first and second desorption pressures.

23. The process of claim 22 wherein the tail gas pressure is from about 20 to 100 psia.

24. The process of claim 18 wherein step (d) is conducted at a purge temperature within about 50° F. of the adsorption temperature.

25. The process of claim 24 wherein the purge temperature is within about 20° F. of the adsorption temperature.

26. The process of claim 18 further comprising cocurrently depressurizing the first adsorber bed simultaneously with said countercurrently depressurizing to the first desorption pressure, withdrawing a purge stream comprising the purge feed from the product end of the first adsorber bed and the first desorption effluent stream from the feed end of the first adsorber bed.

27. The process of claim 26 further comprising passing at least a portion of the purge stream to a fourth adsorber bed undergoing said countercurrently purging.

28. The process of claim 18 further comprising passing an effective quantity of purge feed during said countercurrently purging to provide an increased concentration of said other component in the feed end of the first adsorber bed relative to the product end.

29. The process of claim 28 wherein the effective quantity of purge feed to provide an increased concentration of the other component is from about 0.5 to 1.5 volumes of purge gas feed per volume of feedstream per cycle.

30. The process of claim 28 wherein the second desorption pressure is effective to cause the desorption of the other component in the feed end of the first adsorber bed.

31. A pressure swing adsorption process for enriching the hydrogen concentration of a feedstream comprising hydrogen and at least one other component selected from the methane, ethane, carbon monoxide, carbon dioxide, ammonia, nitrogen, hydrogen sulfide and water, wherein a plurality of adsorber beds having a feed end and a product end are employed and each of said adsorber beds is subjected to a repetitive cycle comprising the steps of:

(a) passing the feedstream to the feed end of a first adsorber bed containing adsorbent having adsorptive capacity for said other component at effective adsorption conditions including an elevated adsorption pressure, and withdrawing a product stream enriched in hydrogen relative to the feedstream from the product end of the first adsorber bed;

(b) cocurrently depressurizing the first adsorber bed to an equalization pressure that is lower than the adsorption pressure and passing the effluent therefrom to the product end of a second adsorber bed being repressurized;

(c) countercurrently depressurizing the first adsorber bed to a first desorption pressure that is lower than the equalization pressure and effective to desorb said other component and withdrawing a first desorption effluent comprising said other component from the feed end of the first adsorber bed;

(d) countercurrently purging the first adsorber bed with a purge feed comprising hydrogen and withdrawing a purge effluent comprising said other component from the feed end of the first adsorber bed;

(e) either simultaneously with or subsequently to said countercurrently purging, further countercurrently depressurizing the first adsorber bed to a second desorption pressure that is lower than the first desorption pressure and effective to further desorb said other component and withdrawing a second desorption effluent stream comprising said other component from the feed end of the first adsorber bed, wherein said further countercurrently depressurizing is conducted by passing at least a portion of the first desorption effluent stream from a third adsorber bed which is simultaneously undergoing said countercurrently depressurizing to the first desorption pressure, through an ejector in operative communication with the first adsorber bed; and (f) repressurizing the first adsorber bed to the adsorption pressure.

* * * * *